No. 859,677. PATENTED JULY 9, 1907.
H. S. MARTIN.
FISH HOOK.
APPLICATION FILED FEB. 6, 1907.
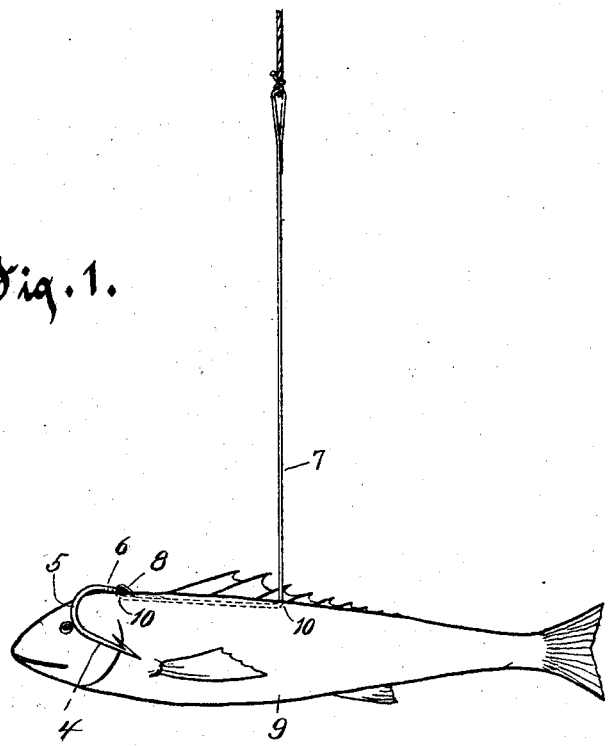
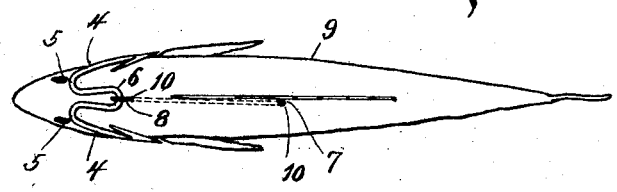
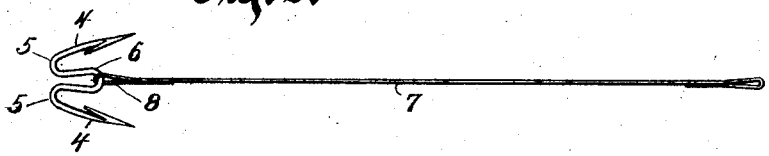

UNITED STATES PATENT OFFICE.

HARRY S. MARTIN, OF RACINE, WISCONSIN.

FISH-HOOK.

No. 859,677.   Specification of Letters Patent.   Patented July 9, 1907.

Application filed February 6, 1907. Serial No. 355,996.

*To all whom it may concern:*

Be it known that I, HARRY S. MARTIN, residing in Racine, in the county of Racine and State of Wisconsin, have invented new and useful Improvements in Fish-Hooks, of which the following is a description, reference being had to the accompanying drawings, which are a part of this specification.

My invention has relation to improvements in fish hooks.

The primary object of the invention is to provide a construction of such character as to permit the minnow to be engaged by the hook without killing or seriously maiming the minnow, whereby a live minnow is provided as bait, thereby greatly increasing the chances of a bite, in view of the fact that fish are very much more readily attracted by live bait.

With the above primary object, and other incidental objects, in view, the invention consists of the devices and parts, or their equivalents, as hereinafter set forth.

In the accompanying drawing, Figure 1 illustrates a minnow with my improved hook applied thereto; Fig. 2 is a plan view of Fig. 1; and Fig. 3 is a detail view of the complete hook.

The hook is a double form of hook made from a single wire having the barbed portions 4, 4, the wire being curved upwardly in two separate curved portions from said barbed portions, as indicated by the numerals 5, 5, and then carried rearwardly in the direction of the barbed portions and in the form of an open loop 6, which lies intermediate of but on a plane higher than said barbed portions. A thin wire 7, preferably of brass, is employed in conjunction with the hook, and this wire is adapted to be removably connected to the hook by providing the outer end thereof with a closed loop 8 through which one of the hooks can be passed, the double hook device being then drawn outwardly until the loop of the wire is seated in and in engagement with the bend of the open loop 6 of said hook device.

In the application of the hook to a live minnow, the wire 7 being separated from the hook, the back of the minnow 9 is pricked with one of the hooks at two longitudinally alined points, indicated by the numerals 10, 10. The fine wire 7 is then passed through these prickings, so that a portion of the wire underlies the skin of the minnow, as clearly shown in Figs. 1 and 2. The wire is then pulled forwardly a sufficient distance to permit one of the hooks to be passed through the loop 8 of the wire until the open loop 6 of the hook is in engagement with said loop 8. The minnow is next grasped and the hook device is drawn backwardly to the position clearly shown in Figs. 1 and 2.

It will be obvious that the above described construction provides a hook capable of engagement with a live minnow without the necessity of killing or seriously maiming the minnow as is the case with various forms of hooks on the market. A fish attracted by this live minnow will bite at the head of the minnow and it is obvious will be readily impaled by the hooks.

What I claim as my invention is:

1. The combination with a fish hook of substantially M-shaped form, the terminals thereof constituting two barbed portions, and the portion intermediate of the barbed portions being in the form of a loop, of a connecting means having its forward end provided with a loop with which the loop of the hook is adapted to engage.

2. The combination with a fish hook having two rearwardly extending barbed portions, and bent upwardly from the forward ends of said barbed portions in two separate bends, and then continued rearwardly in the form of a substantially horizontal loop, the forward end of the loop being open, and said loop lying intermediate of but on a plane higher than the barbed portions, of a wire having its forward end provided with a closed loop with which the open loop of the hook is adapted to engage.

3. A fish hook having two rearwardly extending barbed portions, and bent upwardly from the forward ends of said barbed portions in two separate bends, a loop disposed on said upward turned portion, said loop extending rearwardly a short distance, and a connecting means provided with a loop adapted to be connected to the loop portion of the hook.

In testimony whereof, I affix my signature, in presence of two witnesses.

HARRY S. MARTIN.

Witnesses:
CHAS. KRENZKE,
ANNA F. SCHMIDTBAUER.